US008204717B2

(12) United States Patent
McLaughlin et al.

(10) Patent No.: US 8,204,717 B2
(45) Date of Patent: Jun. 19, 2012

(54) CLOUD COMPUTING AS A BASIS FOR EQUIPMENT HEALTH MONITORING SERVICE

(75) Inventors: Paul F. McLaughlin, Ambler, PA (US); Kevin P. Staggs, Peoria, AZ (US)

(73) Assignee: Honeywell International Inc., Morristown, NJ (US)

( * ) Notice: Subject to any disclaimer, the term of this patent is extended or adjusted under 35 U.S.C. 154(b) by 529 days.

(21) Appl. No.: 12/416,848

(22) Filed: Apr. 1, 2009

(65) Prior Publication Data

US 2010/0256795 A1 Oct. 7, 2010

(51) Int. Cl.
*G06F 19/00* (2006.01)
(52) U.S. Cl. ...................................................... 702/188
(58) Field of Classification Search .................... 702/17, 702/18, 182–185, 188
See application file for complete search history.

(56) References Cited

U.S. PATENT DOCUMENTS

| | | | |
|---|---|---|---|
| 5,657,390 A | 8/1997 | Elgamal et al. | |
| 6,480,896 B1 | 11/2002 | Brown et al. | |
| 6,816,973 B1 | 11/2004 | Gleichauf et al. | |
| 7,130,891 B2 | 10/2006 | Bernardin et al. | |
| 7,233,830 B1 | 6/2007 | Callaghan et al. | |
| 7,266,417 B2 | 9/2007 | Liao | |
| 7,286,897 B2 | 10/2007 | Liu et al. | |
| 7,313,447 B2 * | 12/2007 | Hsiung et al. | 700/9 |
| 7,343,152 B1 | 3/2008 | Khorram | |
| 7,461,403 B1 | 12/2008 | Libenzi et al. | |
| 7,548,977 B2 | 6/2009 | Agapi et al. | |
| 7,584,274 B2 | 9/2009 | Bond et al. | |
| 7,620,986 B1 | 11/2009 | Jagannathan et al. | |
| 7,636,764 B1 | 12/2009 | Fein et al. | |
| 7,684,876 B2 | 3/2010 | Grgic | |
| 7,693,581 B2 | 4/2010 | Callaghan et al. | |
| 7,799,273 B2 | 9/2010 | Popp | |
| 7,870,106 B1 | 1/2011 | Nguyen et al. | |
| 7,873,719 B2 | 1/2011 | Bishop et al. | |
| 7,886,065 B1 | 2/2011 | Satish et al. | |
| 7,957,335 B2 | 6/2011 | Durazzo et al. | |
| 2002/0078382 A1 | 6/2002 | Sheikh et al. | |
| 2003/0014498 A1 | 1/2003 | Kreidler et al. | |
| 2003/0120778 A1 | 6/2003 | Chaboud et al. | |
| 2003/0182359 A1 | 9/2003 | Vorchik et al. | |

(Continued)

FOREIGN PATENT DOCUMENTS

WO WO 2005/020179 A1 3/2005

OTHER PUBLICATIONS

"Real-Time Data Hosting . . . ", www.industrialevolution.com/ms_services_host.html, 1 page, Jan. 2000.

(Continued)

*Primary Examiner* — Edward Raymond (57) ABSTRACT

A system includes a computing cloud having at least one data storage unit and at least one processing unit. The computing cloud is configured to provide at least one service. The system also includes a plurality of clients each configured to communicate with the computing cloud and at least one industrial automation unit and to transmit information associated with the at least one industrial automation unit to the computing cloud. The at least one processing unit in the computing cloud is configured to determine a status of the at least one industrial automation unit using the information provided the clients.

21 Claims, 6 Drawing Sheets

U.S. PATENT DOCUMENTS

| | | |
|---|---|---|
| 2004/0002943 A1 | 1/2004 | Merrill et al. |
| 2004/0128539 A1 | 7/2004 | Shureih |
| 2005/0021594 A1 | 1/2005 | Bernardin et al. |
| 2005/0195840 A1 | 9/2005 | Krapp et al. |
| 2005/0276228 A1 | 12/2005 | Yavatkar et al. |
| 2005/0278441 A1 | 12/2005 | Bond et al. |
| 2006/0004786 A1 | 1/2006 | Chen et al. |
| 2006/0059163 A1 | 3/2006 | Frattura et al. |
| 2006/0085393 A1 | 4/2006 | Modesitt |
| 2006/0155633 A1 | 7/2006 | Fellenstein et al. |
| 2006/0184626 A1 | 8/2006 | Agapi et al. |
| 2006/0230149 A1 | 10/2006 | Jackson |
| 2007/0055702 A1 | 3/2007 | Fridella et al. |
| 2008/0120414 A1 | 5/2008 | Kushalnagar et al. |
| 2008/0159289 A1 | 7/2008 | Narayanan et al. |
| 2008/0208361 A1 | 8/2008 | Grgic |
| 2008/0270523 A1 | 10/2008 | Parmar et al. |
| 2008/0295173 A1 | 11/2008 | Tsvetanov |
| 2009/0058088 A1 | 3/2009 | Pitchford et al. |
| 2009/0125370 A1 | 5/2009 | Blondeau et al. |
| 2009/0132070 A1 | 5/2009 | Ebrom et al. |
| 2009/0172035 A1 | 7/2009 | Lessing et al. |
| 2009/0210071 A1 | 8/2009 | Agrusa et al. |
| 2009/0271012 A1 | 10/2009 | Kopka et al. |
| 2009/0300151 A1 | 12/2009 | Friedman et al. |
| 2009/0300210 A1 | 12/2009 | Ferris |
| 2009/0300635 A1 | 12/2009 | Ferris |
| 2010/0022231 A1 | 1/2010 | Heins et al. |
| 2010/0023151 A1 | 1/2010 | Shieh et al. |
| 2010/0042720 A1 | 2/2010 | Stienhans et al. |
| 2010/0256794 A1 | 10/2010 | McLaughlin et al. |
| 2010/0257227 A1 | 10/2010 | McLaughlin et al. |
| 2010/0257228 A1 | 10/2010 | Staggs et al. |
| 2010/0257605 A1 | 10/2010 | McLaughlin et al. |

OTHER PUBLICATIONS

Notification of Transmittal of the International Search Report and the Written Opinion of the International Searching Authority, or the Declaration dated Oct. 29, 2010 in connection with International Patent Application No. PCT/US2010/028218.

Notification of Transmittal of the International Search Report and the Written Opinion of the International Searching Authority, or the Declaration dated Oct. 29, 2010 in connection with International Patent Application No. PCT/US2010/028210.

Notification of Transmittal of the International Search Report and the Written Opinion of the International Searching Authority, or the Declaration dated Oct. 29, 2010 in connection with International Patent Application No. PCT/US2010/028208.

Aaron Skonnard, "Why Service Virtualization Matters", Microsoft Services, 4 pages, Mar. 2009.

Kevin P. Staggs, et al., "Cloud Computing for an Industrial Automation and Manufacturing System", U.S. Appl. No. 12/416,859, filed Apr. 1, 2009.

Paul F. McLaughlin, et al., "Cloud Computing for a Manufacturing Execution System", U.S. Appl. No. 12/416,790, filed Apr. 1, 2009.

Paul F. McLaughlin, et al., "Cloud Computing as a Basis for a Process Historian", U.S. Appl. No. 12/416,830, filed Apr. 1, 2009.

\* cited by examiner

CLOUD COMPUTING AS A BASIS FOR EQUIPMENT HEALTH MONITORING SERVICE

TECHNICAL FIELD

This disclosure relates generally to computer systems and, more specifically, to the use of cloud computing in equipment health monitoring applications, and systems and methods related to the use of cloud computing in equipment health monitoring applications.

BACKGROUND

Cloud computing is an emerging technology in the information technology (IT) industry. Cloud computing allows for the moving of applications, services and data from desktop computers back to a main server farm. The server farm may be off premises and be implemented as a service. By relocating the execution of applications, deployment of services, and storage of data, cloud computing offers a systematic way to manage costs of open systems, centralize information, and enhance robustness and reduce energy costs.

SUMMARY

This disclosure provides a system and method for using cloud computing in equipment health monitoring applications.

In a first embodiment, a system includes a computing cloud having at least one data storage unit and at least one processing unit. The computing cloud is configured to provide at least one service. The system also includes a plurality of clients each configured to communicate with the computing cloud and at least one industrial automation unit and to transmit information associated with the at least one industrial automation unit to the computing cloud. The at least one processing unit in the computing cloud is configured to determine a status of the at least one industrial automation unit using the information provided by the clients.

In particular embodiments, the at least one processing unit in the computing cloud is configured to perform predictive analysis on the information provided by the clients to determine a health of the at least one industrial automation unit.

In other particular embodiments, the at least one data storage unit in the computing cloud is configured to store the information associated with the at least one industrial automation unit.

In yet other particular embodiments, the at least one processing unit in the computing cloud is configured to process data associated with past equipment failures captured by the clients. The at least one processing unit in the computing cloud may be configured to use the data associated with the past equipment failures to predict future equipment failures. Also, a warning module may be configured to issue a warning prior to a predicted future failure.

In still other particular embodiments, the at least one processing unit in the computing cloud is configured to predict a life expectancy of the at least one industrial automation unit based upon data associated with past equipment failures captured by the clients. The at least one processing unit in the computing cloud may be configured to use the predicted life expectancy to schedule maintenance before another failure occurs.

In a second embodiment, a method of determining a health of equipment includes obtaining at least one set of information associated with an industrial unit. The method also includes analyzing the set of information using at least one processing unit in a computing cloud. The analysis of the set of information includes comparing the set of information with one or more empirical sets of information obtained from a plurality of industrial units. The method further includes determining a status of the industrial unit in real time.

In a third embodiment, a system includes a computing cloud having a database with empirical information associated with failures of one or more industrial tools. The system also includes a client associated with at least one of the industrial tools. The computing cloud is configured to receive at least some of the empirical information from the client and to determine a health of the at least one industrial tool in real time using the received empirical data.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 6, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
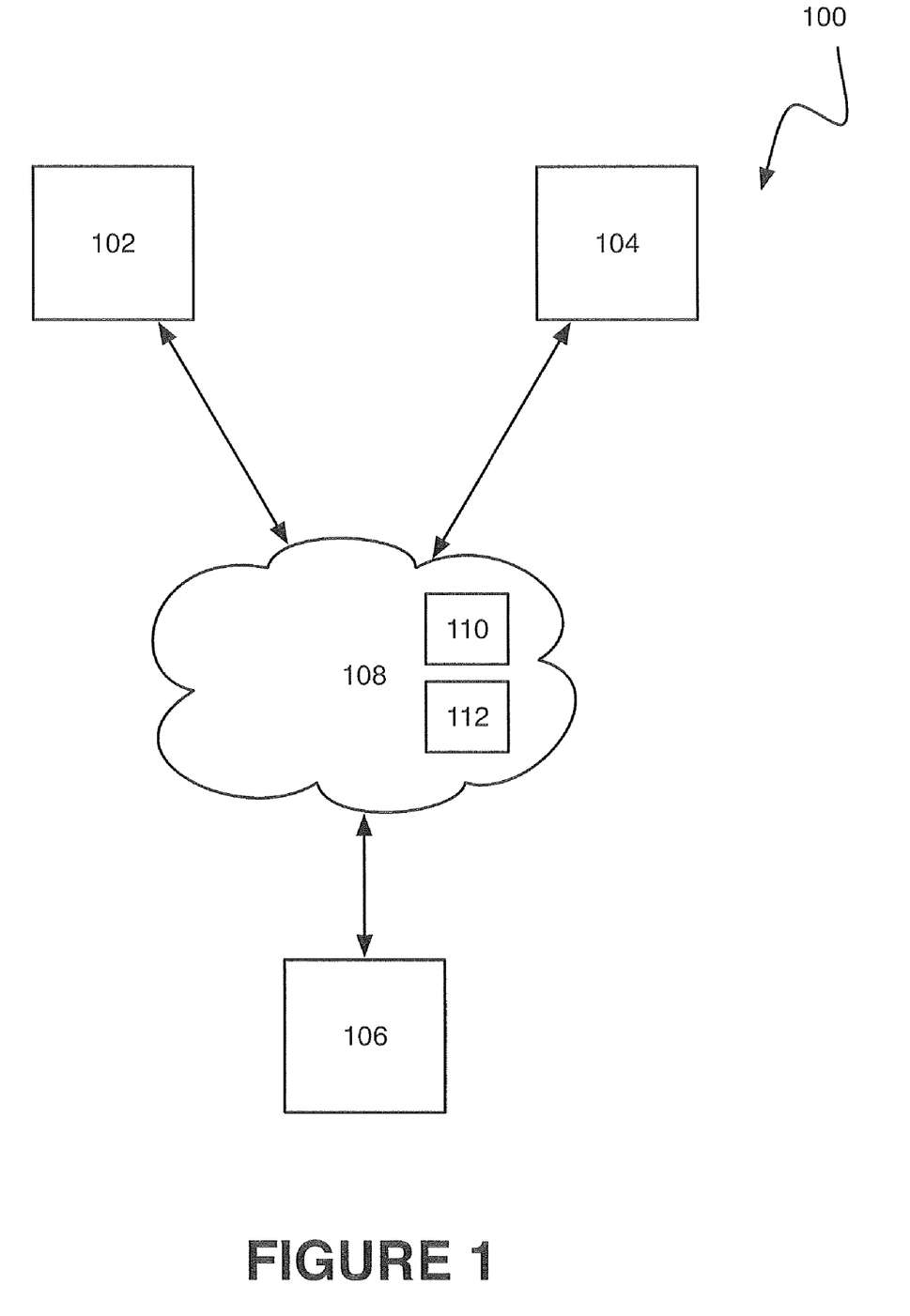
FIG. 1 illustrates an example cloud computing environment according to this disclosure.

FIG. 1 illustrates an example system 100 according to this disclosure. FIG. 1 shows clients 102, 104, and 106 connected to a computing cloud 108. Computing cloud 108 comprises processing unit 110 and data storage unit 112, both of which are accessible to clients 102, 104, and 106. One of the innovative aspects of this disclosure is the ability to design a flexible, robust cloud 108 that can service a variety of deployment environments through an innovative hybrid approach. This hybrid approach recognizes both the type of information needed as well as the location of where that information needs to be. For instance in a manufacturing execution system (MES) used in an automated factory setting, the system must recognize both the types of information needed to be processed as well as which information needs to be stored locally and which information may be stored in a computing cloud.

Computing cloud 108 is a computing cloud that is capable of both storing information and performing data functions on information. A computing cloud comprises at least one computer that is accessible from a remote location. The computing cloud 108 may comprise a plurality of storage devices that will be referred to as collectively the storage unit 112, as well as a plurality of processing units that will be referred to collectively as the processing unit 110. The computing cloud 108 may comprise hardware that is cost prohibitive to deploy and maintain at individual clients 102, 104, and 106. In addition, the computing cloud 108 may comprise software that is cost prohibitive to install, deploy, and maintain at individual computing clouds. Therefore, the computing cloud 108 may provide this hardware and software through secure connections to clients 102, 104, and 106. While there is one computing cloud 108 shown in FIG. 1, it is explicitly understood that a plurality of clouds may be consistent with this disclosure.

Clients 102, 104, and 106 are individual computers, plant sites, or operational locations that are in communication with the computing cloud 108. Clients 102, 104, and 106 are capable of accessing both the processing unit 110 and storage unit 112 that are located in the computing cloud 108. Clients 102, 104, and 106 are able to access both local processes as well as information from the computing cloud 108. Clients 102-106 may include a plurality of manufacturing tools and sensors to monitor manufacturing tools in an industrial environment. Clients 102-106 may also include a plurality of thin clients, individual computers, or other communication devices. The sensors may detect any operational condition of one or more manufacturing tools, such as temperature, pressure, airflow, viscosity of a lubricant, vibration, or other measureable operating parameter(s).

Clients 102-106 communicate with the computing cloud 108 through any secured or unsecured method, including Hypertext Transfer Protocol Secure (HTTPS), secure telnet, or file transfer protocol secure (FTPS). It is understood that secure methods may be preferred over unsecure methods, and that the particular method chosen will depend upon the requirements of the function being accessed. This disclosure should not be interpreted as being limited to any particular protocol or method of transferring data.

It us understood that the communication between the clients 102-106 and the computing cloud 108 may be unidirectional or bidirectional. In many of the systems and methods disclosed herein, bidirectional communication is preferred. The phrase "unidirectional communication" refers to communication in which data is sent from one communications device to a second communications device. The term "bidirectional communication" refers to communication where data is sent and received by two or more communication devices.

In some embodiments, the computing cloud 108 may leverage a Service Oriented Architecture (SOA) to abstract consumers of cloud services from the location services themselves. When a cloud user at a given client invokes a function, such as an MES function, that function could be performed by MES components local to the same client or redirected to MES components running on a server in the computing cloud 108. This redirection is performed by a service bus that exposes a set of service endpoints to users who interact with these services as if the services were local. The service bus directs requests for those services to the appropriate service providers either locally or in the cloud based on configured mapping. Mapping can be done on a per service basis, allowing a mix of local and cloud-based services to be used. The service bus itself could be local to the plant or also located in the cloud. The disclosed systems and methods can be designed for multi-tenancy, such that many companies can share the same physical database resources but keep their data respective entirely private.

One of the innovative features of this disclosure is the use of a hybrid approach when distributing data storage and data processing among a plurality of clouds in use by a manufacturing execution system. Some features of the clients 102, 104, and 106 can be better performed by the computing cloud 108 than at the client 102, 104, and 106. By determining which functions can be performed more efficiently in the computing cloud 108 than at the local client 102, 104, and 106, computing resources can be allocated in such a way as to maximize performance.

Figure 2:
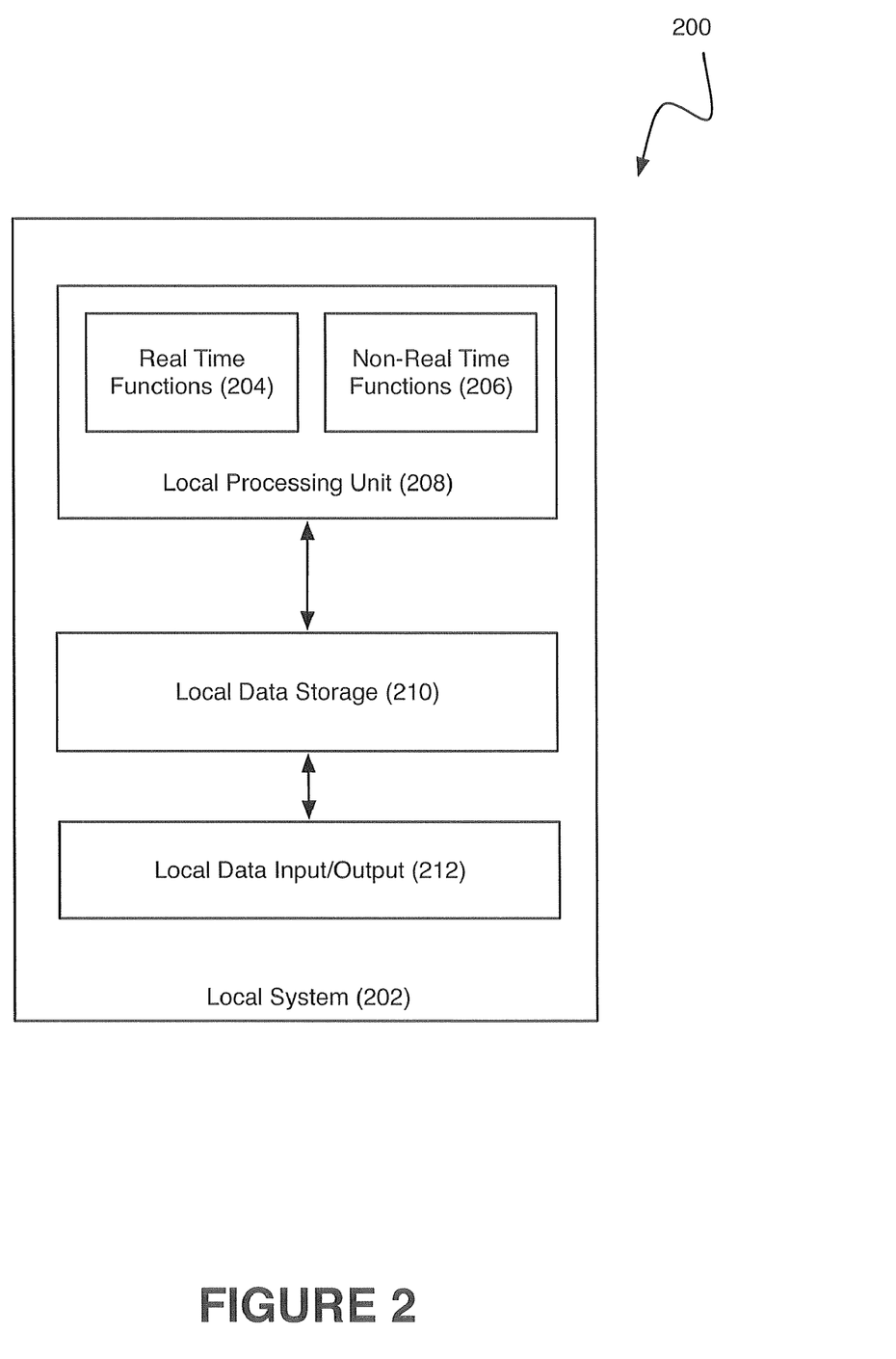
FIG. 2 illustrates an example local system environment according to this disclosure.

FIG. 2 is an illustration 200 of a local system 202. Each client 102, 104, and 106 comprises a local system 202. The local system 202 comprises a local processing unit 208, a local data storage 210, and a local data input/output 212. The local processing unit 208 may comprise both real time functions 204 and non-real-time functions 206.

Real time functions are those functions that instruct or control other devices, including the actual mechanical systems used in a factory. These real time functions are generally always required to be available, and may be designed to be non-resource intensive. An example of these real time functions may include the programming of a basic automated system to perform a specific function (e.g., drill into a substance) for a specific time.

Non-real time functions are functions that may be used to form the real-time functions. Examples of non-real-time functions are those functions used to train the real time functions and simulations of the products created by the non-real-time functions. These non-real-time functions are may be processor intensive and require specialized software.

Not only may functions be performed on a real time or non-real time basis, data may be required by the system on a real or non-real time basis. In one embodiment, data that is required on a real time basis will be stored locally in local data storage 210 while data that is not needed on a real time basis may be stored in the storage unit 112 in the computing cloud 108.

One of the problems with the conventional deployment of MES systems is that the most accurate simulation models were too expensive to deploy into the local systems. In addition, the most accurate simulation models had storage requirements that exceeded the available storage of the local data storage 210. This disclosure overcomes these problems through a process of both data and process segregation. By determining whether a specific process or data is required to be performed in real time or in non-real time, those functions that can be delayed may be placed into the computing cloud 108.

The delineation between real time and non-real time is intended to be an exemplary method of determining which processes and data should be stored locally and which processes and data should be stored in the computing cloud 108. It is expressly understood that other delineations may be used, based on priority or other characteristics of the data. Any system or method that delineates shared processes and storage, and then executes the system and method using a hybrid approach on both a computing cloud 108 and a local system 202 is explicitly contemplated by this disclosure.

Another example of a delineation that may be used to determine which data and which functions are to be placed into the computing cloud 108 is based upon whether the data and functions are "high level" or "low level". A high level function may include a function that is not directly tied to the actual operation of a piece of machinery. Examples of high level functions may include scheduling, reconciliation, or other functions that may be executed in the computing cloud 108.

One of the advantages to the disclosed hybrid approach is the enhancement of manufacturing execution systems (MES). Manufacturing execution systems are used to provide instructions or routines to basic automated systems. Basic automated systems in turn are used to instruct systems directly on what actions to perform (e.g., the actual operation of automation hardware).

Another advantage of the presently disclosed systems and methods is the ability to rapidly deploy new services or features to a plurality of clients without the need to make changes to the clients themselves. As a new service becomes available (e.g., simulation becomes available), this service may be offered to improve the manufacturing process at a given site without the need for reprogramming at the site.

Yet another advantage of the presently disclosed systems and methods is the ability for enhanced data collection and analysis. Through the linking of the clients 102, 104, and 106 to the computing cloud 108, data may be uploaded to the cloud 108 by the clients 102, 104, and 106 that represents real time information related to the data processes. This information may, in turn, be used by the computing cloud 108 for a number of functions, including monitoring the production results and identifying potential problems with equipment. For instance, the cloud may, in some embodiments, apply a model, such as a heuristic model, to identify potential equipment failure. This would allow for proactive preventative maintenance of the equipment.

Figure 3:
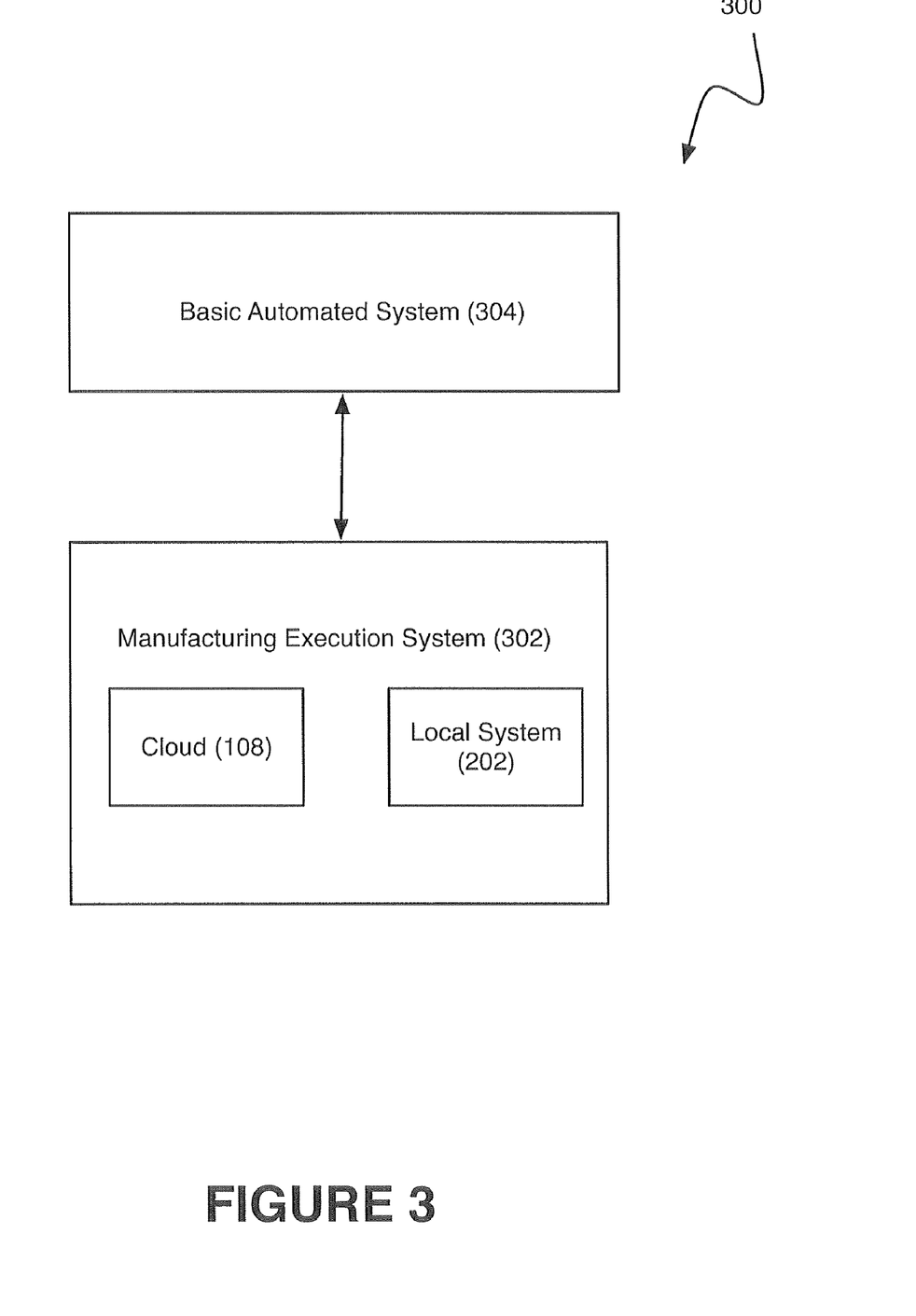
FIG. 3 illustrates an example manufacturing system according to this disclosure.

FIG. 3 is an example embodiment 300 of one system using a manufacturing execution system 302. In this example embodiment, the manufacturing execution system 302 comprises both the computing cloud 108 and the local system 202. The manufacturing execution system 302 is used to control the basic automated system 304. It is understood that the manufacturing execution system may comprise a plurality of local systems and a plurality of computing clouds.

Figure 4:
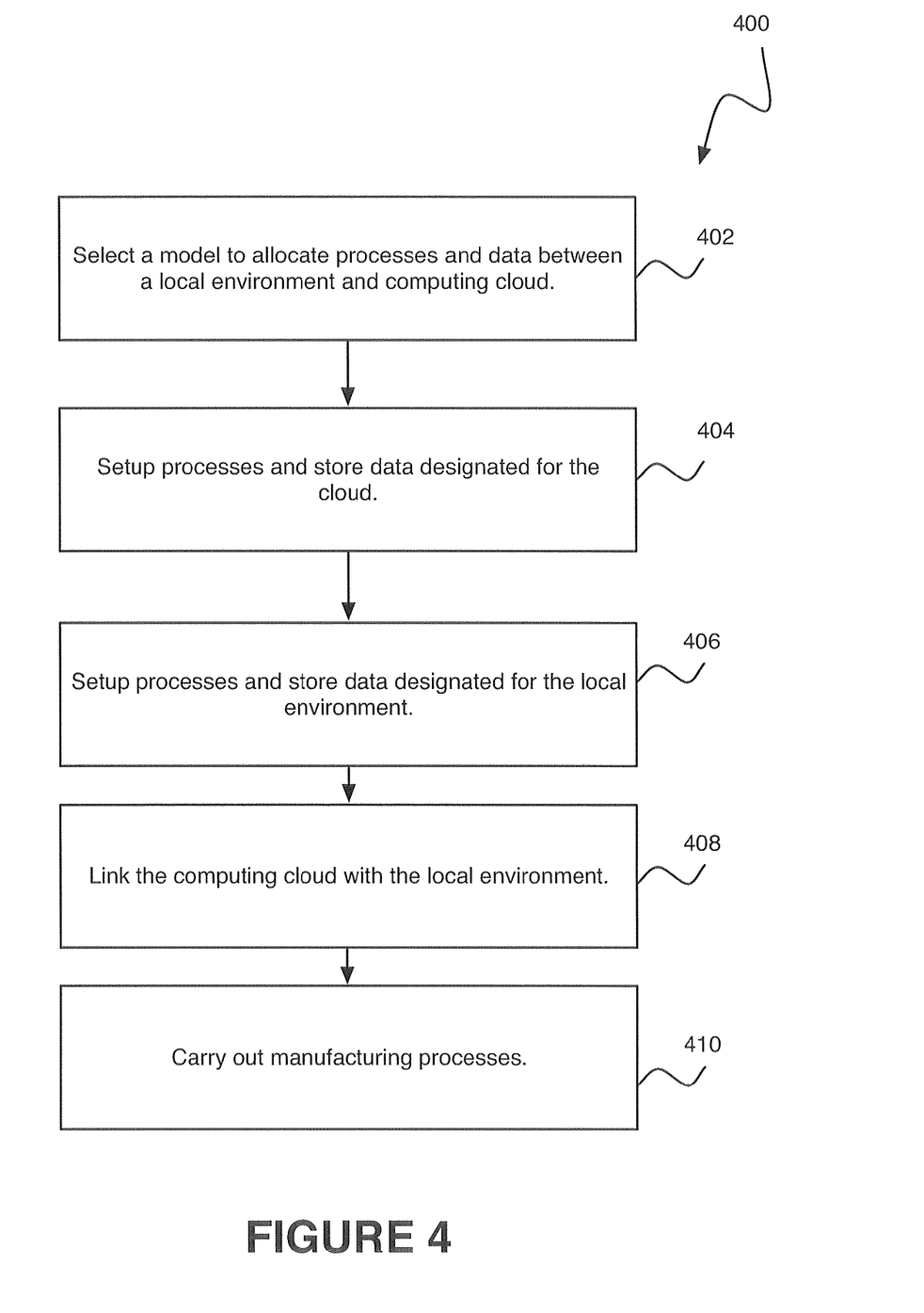
FIG. 4 illustrates an example method of allocating processes and data according to this disclosure.

FIG. 4 is an example of one method 400 of executing the presently disclosed hybrid approach. In this embodiment, a model is selected to allocate processes and data between the local environment 202 and the computing cloud 108 in block 402. In block 404, the processes for the cloud are setup, and data is stored in the cloud. In block 406, the processes for the local environment are setup, and data is stored in the local environment. In block 408, the computing cloud 108 is linked to the local environment 202. In block 410, the manufacturing processes are carried out.

Yet another benefit of the present hybrid approach is the ability to create a process historian capable of capturing, providing, and archiving process-related data for process operations. Today, manufacturing customers require ever more sophisticated tools (such as dashboards) to monitor both the health of their manufacturing processes as well as the control equipment for the automation of the manufacturing. Cloud computing provides a basis for a new model of providing equipment health services, in terms of both solving information technology concerns around managing and deploying equipment health services as well as being a computing basis to perform storage and analysis of the data to provide higher-order information (such as preventive maintenance needs uncovered by sophisticated algorithms hosted in the computing cloud 108).

In some embodiments, this disclosure allows for all of the data related to health services of the clients 102-106 to be stored in a central global data repository within the computing cloud 108. The data stored in this repository may include the current state of health of equipment located throughout one or more manufacturing systems (locally or around the globe). In addition to the current state of health, data can also be provided in the database related to maintaining and assessing the state of health of the control equipment. This data may be provided by the control equipment manufacturers. The control equipment manufacturers are also provided with the capability to provide maintenance notices through the computing cloud 108.

By doing this, the control equipment manufacturers may only need to inform one location of any maintenance notice. The computing cloud 108 can then distribute that notice to all control equipment users and schedule the maintenance of the equipment. The usage of computing cloud 108 also allows for information from control equipment that needs assessment to be brought to experts to analyze that data virtually instantaneously. This provides for faster resolution of problems.

In some embodiments, local collectors and other devices can aggregate health data in one or more systems, and these systems can be in the same geographic area or diverse geographic areas. Cloud services may then collect, analyze, and inform based on this data.

Figure 5:
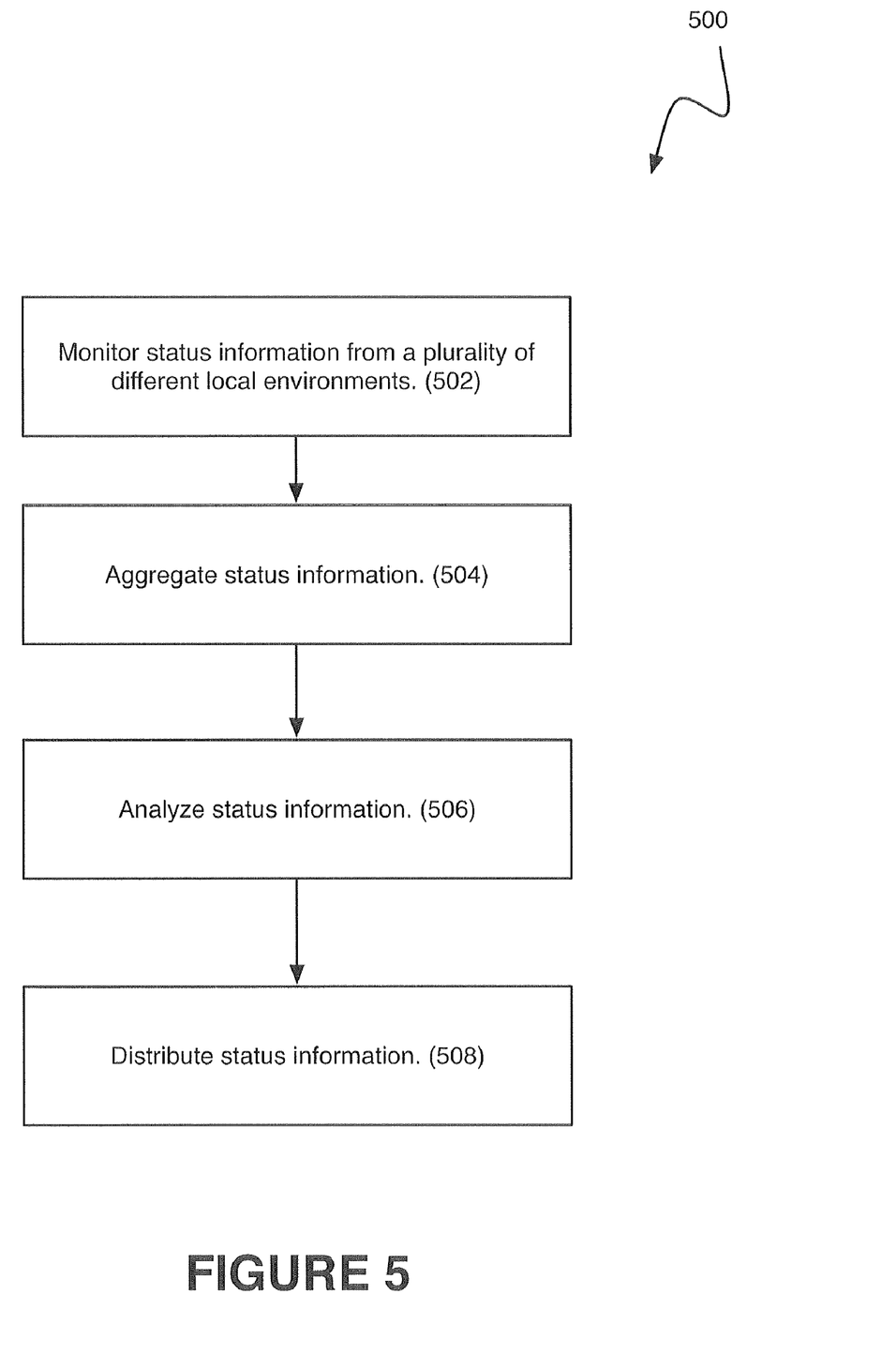
FIG. 5 illustrates an example method of monitoring status information according to this disclosure.

FIG. 5 illustrates an example method 500 of monitoring status information according to this disclosure. In block 502, status information is monitored from a plurality of different local environments. In block 504, the status information is aggregated from the local environments. In block 506, the status information is analyzed. In block 508, the analyzed status information is distributed.

One of the advantages of the method disclosed in FIG. 5 is that the present systems can use information from local environments in other environments. For instance, if a particular tool is starting to record a specified vibration and then the tool fails, information relating to the vibration may be propagated to each of the other local environments 202 warning them of possible failure. The sharing of information from one local environment to other local environments may offer a way to avoid damaging part failures. By aggregating and analyzing manufacturing data in real time, improvements may be made to the manufacturing processes.

The information to be stored in the local environment 202 and the computing cloud 108 (as opposed to that which is stored only in the computing cloud 108) may be determined based upon what information is anticipated to be needed by the local environment 202. For instance, the local environment 202 may take readings every 10 seconds but only require readings every minute. Each of the readings may be stored in the computing cloud 108 for enhanced analysis, but only one reading a minute may need to be stored in the local environment 202. This storage allows the local environment 202 to cache the data that it anticipates needing while providing the computing cloud 108 with all available data. In this way, the computing cloud 108 has as much information as possible to perform analysis, while the local environment has stored the information it needs for immediate operation.

Figure 6:
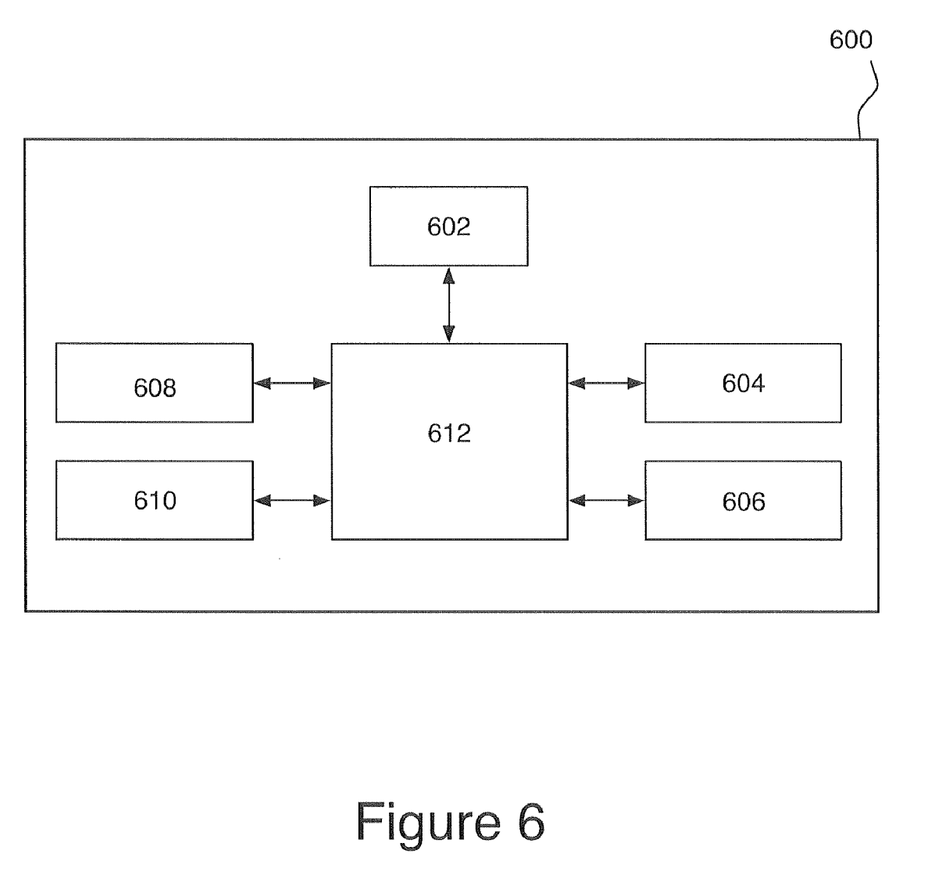
FIG. 6 illustrates an example computer system supporting cloud computing according to this disclosure.

Computing cloud 108 and elements of the local environment 202 described above may be implemented on any general-purpose computer 600 with sufficient processing power, memory resources, and network throughput capability to handle the necessary workload placed upon it. A consumer home personal computer, networked to computing cloud 108 through a wide area network, such as the Internet, may be used in conjunction with the disclosed embodiments. The consumer home personal computer may share some, or all, of the elements of computing cloud 108. FIG. 6 illustrates a typical, computer system suitable for implementing one or more embodiments disclosed herein. The general-purpose computer 600 includes a processor 612 (which may be referred to as a central processor unit or CPU) that is in communication with memory devices including secondary storage 602, read only memory (ROM) 604, random access memory (RAM) 606, input/output (I/O) 608 devices, and network connectivity devices 610. The processor may be implemented as one or more CPU chips.

The secondary storage 602 is typically comprised of one or more disk drives or tape drives and is used for non-volatile storage of data and as an over-flow data storage device if RAM 606 is not large enough to hold all working data. Secondary storage 602 may be used to store programs that are loaded into RAM 606 when such programs are selected for execution. The ROM 604 is used to store instructions and perhaps data that are read during program execution. ROM 604 is a non-volatile memory device that typically has a small memory capacity relative to the larger memory capacity of secondary storage. The RAM 606 is used to store volatile data and perhaps to store instructions. Access to both ROM 604 and RAM 606 is typically faster than to secondary storage 602.

I/O 608 devices may include printers, video monitors, liquid crystal displays (LCDs), touch screen displays, keyboards, keypads, switches, dials, mice, track balls, voice recognizers, card readers, paper tape readers, or other well-known input devices. The network connectivity devices 610 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity devices 610 may enable the processor 612 to communicate with an Internet or one or more intranets. With such a network connection, it is contemplated that the processor 612 might receive information from the network, or might output information to the network in the course of performing the above-described method steps. Such information, which is often represented as a sequence of instructions to be executed using processor 612, may be received from and outputted to the network, for example, in the form of a computer data signal embodied in a carrier wave.

Such information, which may include data or instructions to be executed using processor 612 for example, may be received from and outputted to the network, for example, in the form of a computer data baseband signal or signal embodied in a carrier wave. The baseband signal or signal embodied in the carrier wave generated by the network connectivity devices 610 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 612 executes instructions, codes, computer programs, scripts that it accesses from hard disk, floppy disk, optical disk (these various disk based systems may all be considered secondary storage 602), ROM 604, RAM 606, or the network connectivity devices 610.

While shown as a series of steps, various steps in FIGS. 4 and 5 could overlap, occur in parallel, occur in a different order, or occur multiple times. Further, note that these steps could occur at any suitable time, such as in response to a command from a user or external device or system.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A system comprising:
a computing cloud comprising one or more data storage units and one or more processing units, wherein the computing cloud is configured to provide at least one service and shared hardware and software resources; and
a plurality of clients;
wherein the computing cloud is configured to provide the at least one service and the shared hardware and software resources for use by the clients;
wherein each client is configured to communicate with the computing cloud and at least one industrial automation unit and to transmit information associated with the at least one industrial automation unit to the computing cloud; and
wherein at least one of the one or more processing units in the computing cloud is configured to determine a status of the at least one industrial automation unit using the information provided by the clients.

2. The system of claim 1, wherein at least one of the one or more processing units in the computing cloud is configured to perform predictive analysis on the information provided by the clients to determine a health of the at least one industrial automation unit.

3. The system of claim 1, wherein at least one of the one or more data storage units in the computing cloud is configured to store the information associated with the at least one industrial automation unit.

4. The system of claim 1, wherein at least one of the one or more processing units in the computing cloud is configured to process data associated with equipment operation prior to an equipment failure in a first location and captured by at least one of the clients.

5. The system of claim 4, wherein at least one of the one or more processing units in the computing cloud is configured to use the data associated with the equipment operation prior to the equipment failure to predict a future failure of equipment in a second location.

6. The system of claim 5, wherein:
at least one of the one or more processing units in the computing cloud is configured to identify a client associated with the equipment in the second location and generate a warning of the predicted future failure; and
the system further comprises:
a warning module configured to issue a warning to the client associated with the equipment in the second location prior to the predicted future failure.

7. The system of claim 1, wherein the shared hardware and software resources include processing resources, memory resources, and network capacity resources.

8. The system of claim 1, wherein at least one of the one or more processing units in the computing cloud is configured to predict a life expectancy of the at least one industrial automation unit based upon data associated with past equipment failures captured by the clients.

9. The system of claim 8, wherein at least one of the one or more processing units in the computing cloud is configured to use the predicted life expectancy to schedule maintenance before another failure occurs.

10. A method of determining a health of equipment, the method comprising:
providing, using a cloud computing node, shared hardware and software resources for use by a plurality of clients;
receiving, using the shared hardware and software resources, at least one set of information associated with an industrial unit;
analyzing the set of information using at least one processing unit in the computing cloud, wherein the analysis of the set of information comprises comparing the set of information with one or more empirical sets of information obtained from a plurality of industrial units; and
determining a status of the industrial unit in real time.

11. The method of claim 10, wherein the status of the industrial unit comprises information associated with an expected failure.

12. The method of claim 10, wherein the set of information is obtained by a first client, wherein the set of information includes data associated with operation of the industrial unit prior to failure of the industrial unit in a first location, and wherein the method further comprises:
predicting a future failure of a second industrial unit in a second location using the data associated with operation of the industrial unit prior to failure of the industrial unit;
identifying a second client associated with the second industrial unit; and
warning the second client of the future failure of the second industrial unit.

13. The method of claim 12, wherein the first client connects to the computing cloud through a secure connection.

14. The method of claim 10, wherein the set of information is obtained through at least one sensor attached to the industrial unit.

15. The method of claim 14, wherein the sensor is configured to obtain at least one of temperature data, pressure data, airflow data, viscosity data of a lubricant, and vibration data associated with the industrial unit.

16. A system comprising:
a computing cloud comprising a database with empirical information associated with failures of one or more industrial tools; and
a plurality of clients associated with at least one of the industrial tools;
wherein the computing cloud is configured to provide shared hardware and software resources for use by the clients; and
wherein the computing cloud is configured to receive at least some of the empirical information from the clients using the shared hardware and software resources resources and to determine a health of the at least one industrial tool in real time using the received empirical data.

17. The system of claim 16, wherein the computing cloud is configured to determine a life expectancy of the at least one industrial tool.

18. The system of claim 16, wherein the empirical data is obtained from the plurality of clients.

19. The system of claim 16, wherein the computing cloud is further configured to process data associated with tool operation prior to a tool failure in a first location and captured by a first client, use the data to predict a future failure of a tool in a second location, identify a second client associated with the tool in the second location, and warn the second client of an impending tool failure.

20. The system of claim 16, wherein at least one of the clients is configured to connect to the computing cloud through a secure connection.

21. The system of claim 1, wherein the computing cloud supports a Service Oriented Architecture (SOA).

* * * * *